(12) United States Patent
Iio et al.

(10) Patent No.: US 10,337,758 B2
(45) Date of Patent: Jul. 2, 2019

(54) HEAT EXCHANGER VENTILATOR

(71) Applicant: Panasonic Intellectual Property Management Co., Ltd., Osaka (JP)

(72) Inventors: Kouji Iio, Aichi (JP); Yasuaki Shima, Aichi (JP); Kenichi Ishiguro, Aichi (JP); Yasuhiro Suzuki, Aichi (JP); Toshihiko Hashimoto, Aichi (JP); Teruaki Yasunishi, Aichi (JP); Yoshiyuki Kido, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

(21) Appl. No.: 15/502,843

(22) PCT Filed: Aug. 17, 2015

(86) PCT No.: PCT/JP2015/004068
§ 371 (c)(1),
(2) Date: Feb. 9, 2017

(87) PCT Pub. No.: WO2016/047028
PCT Pub. Date: Mar. 31, 2016

(65) Prior Publication Data
US 2017/0234571 A1   Aug. 17, 2017

(30) Foreign Application Priority Data

Sep. 25, 2014  (JP) .................................. 2014-195450
Feb. 20, 2015  (JP) .................................. 2015-031276

(51) Int. Cl.
F28D 7/02     (2006.01)
F24F 12/00    (2006.01)
(Continued)

(52) U.S. Cl.
CPC ............ *F24F 12/006* (2013.01); *F24F 13/22* (2013.01); *F24F 11/30* (2018.01); *F24F 11/77* (2018.01);
(Continued)

(58) Field of Classification Search
CPC .. F24F 11/89; F24F 7/06; F24F 5/0035; F24F 12/006; F24F 13/22; F24F 11/77;
(Continued)

(56) References Cited

U.S. PATENT DOCUMENTS 6,176,305 B1 *  1/2001  Haglid .................. F24F 5/0035
                                                         165/231
2006/0151165 A1   7/2006  Poirier
(Continued)

FOREIGN PATENT DOCUMENTS

EP    1387375 A2    2/2004
JP    6-002040 U    1/1994
(Continued)

OTHER PUBLICATIONS

International Search Report of PCT application No. PCT/JP2015/004068 dated Nov. 17, 2015.

*Primary Examiner* — Davis D Hwu
(74) *Attorney, Agent, or Firm* — McDermott Will & Emery LLP

(57) ABSTRACT

Supply air conduit (7) along which air is sent from outdoors to indoors by the air supply fan (9), exhaust air conduit (8) along which air is sent from indoors to outdoors by the air exhaust fan (10), and heat exchange element (6) provided at a position where supply air conduit (7) and exhaust air conduit (8) intersect, for exchanging heat between indoor air and outdoor air for ventilation are included. In addition, in exhaust air conduit (8), humidity detection unit (14) is provided at a position upstream of heat exchange element
(Continued)

(6), and, in supply air conduit (7), temperature detection unit (13) is provided at a position upstream of heat exchange element (6). In addition, controller (11) reduces, when a temperature detected by temperature detection unit (13) and humidity detected by humidity detection unit (14) are pre-determined values, speed of an air supply motor and an air exhaust motor so that air flow rates at which moisture neither condenses nor freezes are attained.

5 Claims, 6 Drawing Sheets

(51) Int. Cl.
  *F24F 13/22* (2006.01)
  *F24F 11/77* (2018.01)
  *F24F 110/20* (2018.01)
  *F24F 11/30* (2018.01)
  *F24F 110/12* (2018.01)
  *F24F 110/22* (2018.01)

(52) U.S. Cl.
  CPC ..... *F24F 2013/221* (2013.01); *F24F 2110/12* (2018.01); *F24F 2110/20* (2018.01); *F24F 2110/22* (2018.01); *Y02B 30/563* (2013.01)

(58) Field of Classification Search
  CPC .... F24F 2110/20; F24F 2110/22; F24F 11/30; F24F 2110/12; F24F 2013/221; Y02B 30/563
  USPC .......................................................... 165/230
  See application file for complete search history.

(56) References Cited

U.S. PATENT DOCUMENTS

| 2013/0303074 | A1* | 11/2013 | Sakai | F24F 7/06 |
| | | | | 454/256 |
| 2017/0108231 | A1* | 4/2017 | Hasegawa | F24F 11/89 |

FOREIGN PATENT DOCUMENTS

| JP | 10-318593 A | 12/1998 |
| JP | 11-325535 | 11/1999 |
| JP | 2004-071225 A | 3/2004 |
| JP | 2006-071225 | 3/2006 |

* cited by examiner

HEAT EXCHANGER VENTILATOR

TECHNICAL FIELD

The present invention relates to a heat exchanger ventilator for exchanging heat between outdoor air and indoor air.

BACKGROUND ART

Conventionally, as for this kind of ventilator, a ventilator which is installed in a building to introduce outdoor air from an outdoor air supply port into indoor, via a built-in heat exchange element (for example, see Patent Literature 1) has been known.

Such a ventilating air conditioner will be described with reference to FIG. 6

As shown in FIG. 6, ventilator body 101 is installed in a loft space or under-the-roof space of a building. Fresh outdoor air enters from outdoor air supply port 102, passes through built-in heat exchange element 103, and flows, via indoor air supply port 104, into indoors. On the other hand, foul indoor air enters from indoor exhaust port 105, passes through heat exchange element 103, and flows, via outdoor exhaust port 106, toward outdoors. Fresh outdoor air entering from outdoor air supply port 102 and foul indoor air entering from indoor exhaust port 105 are transported, via heat exchange element 103, by air supply fan 109 and air exhaust fan 110 coupled by single shaft 108 of motor 107.

CITATION LIST

Patent Literature

PTL 1: Unexamined Japanese Patent Publication No. $H_{11}$-325535

SUMMARY OF THE INVENTION

In such a conventional heat exchanger ventilator, dew sometimes condenses on a heat exchange element due to a low outdoor air temperature in a winter season. An intermittent operation is sometimes performed to prevent dew from freezing on a heat exchange element. However, during such an intermittent operation, ventilation for supplying and exhausting air is interrupted.

In view of the foregoing, the present invention has an object to provide a heat exchanger ventilator capable of continuously supplying and exhausting air for ventilation while preventing moisture from freezing on a heat exchange element.

The present invention includes an air supply fan equipped with an air supply motor, an air exhaust fan equipped with an air exhaust motor, a supply air conduit along which air is sent from outdoors to indoors by the air supply fan, and an exhaust air conduit along which air is sent from indoors to outdoors by the exhaust fan. At a position where the supply air conduit and the exhaust air conduit intersect, a heat exchange element is provided for exchanging heat between indoor air and outdoor air when air between indoors and outdoors are ventilated. In addition, in the supply air conduit, a temperature detection unit is provided at a position upstream of the heat exchange element, and, in the exhaust air conduit, a humidity detection unit is provided at a position upstream of the heat exchange element. In addition, the air supply motor and the air exhaust motor are controlled for operations and speed by a controller. Furthermore, when a temperature detected by the temperature detection unit is below a first predetermined temperature, and humidity detected by the humidity detection unit falls within a first predetermined humidity range, the controller reduces speed of the air supply motor and the air exhaust motor so that a predefined first $A_1$ supply air flow rate and a predefined first $A_1$ exhaust air flow rate are attained. In addition, when humidity detected by the humidity detection unit falls within a second predetermined humidity range, the controller reduces speed of the air supply motor and the air exhaust motor so that a predefined first $A_2$ supply air flow rate and a predefined first $A_2$ exhaust air flow rate are attained. In this case, a maximum value of the first predetermined humidity range<a minimum value of the second predetermined humidity range, the first $A_1$ supply air flow rate>the first $A_2$ supply air flow rate, and the first $A_1$ exhaust air flow rate>the first $A_2$ exhaust air flow rate are satisfied.

An operation for exchanging heat between supply air and exhaust air can be continued by reducing speed of the air supply motor and the air exhaust motor to increase exchange efficiency to raise a temperature on an exhaust air side of the heat exchange element to lower humidity in order to prevent moisture from condensing and freezing on an outlet portion on the exhaust air side of the heat exchange element.

In addition, a heat exchanger ventilator according to an aspect of the present invention includes an air supply fan equipped with an air supply motor, an air exhaust fan equipped with an air exhaust motor, a supply air conduit along which air is sent from outdoors to indoors by the air supply fan, and an exhaust air conduit along which air is sent from indoors to outdoors by the air exhaust fan. At a position where the supply air conduit and the exhaust air conduit intersect, a heat exchange element is provided for exchanging heat between indoor air and outdoor air when air between indoors and outdoors are ventilated. In addition, in the exhaust air conduit, a temperature and humidity detection unit for detecting a temperature and humidity is provided at a position downstream of the heat exchange element, and the air supply motor and the air exhaust motor are controlled for operations and speed by a controller. In addition, the controller calculates a first dew point temperature based on a temperature and humidity detected by the temperature and humidity detection unit, and then, when a temperature detected by the temperature and humidity detection unit is equal to or above the first dew point temperature, the controller controls the air supply motor and the air exhaust motor to keep their speed. Furthermore, when a temperature detected by the temperature and humidity detection unit is below the first dew point temperature, the controller reduces speed of the air supply motor and the air exhaust motor so that a predefined first supply air flow rate and a first exhaust air flow rate are attained.

As a result, an operation for exchanging heat between supply air and exhaust air can be continued, while moisture is prevented from condensing and freezing on the heat exchange element.

DESCRIPTION OF EMBODIMENTS

Exemplary embodiments of the present invention will be described with reference to the drawings.

First Exemplary Embodiment

Figure 1:
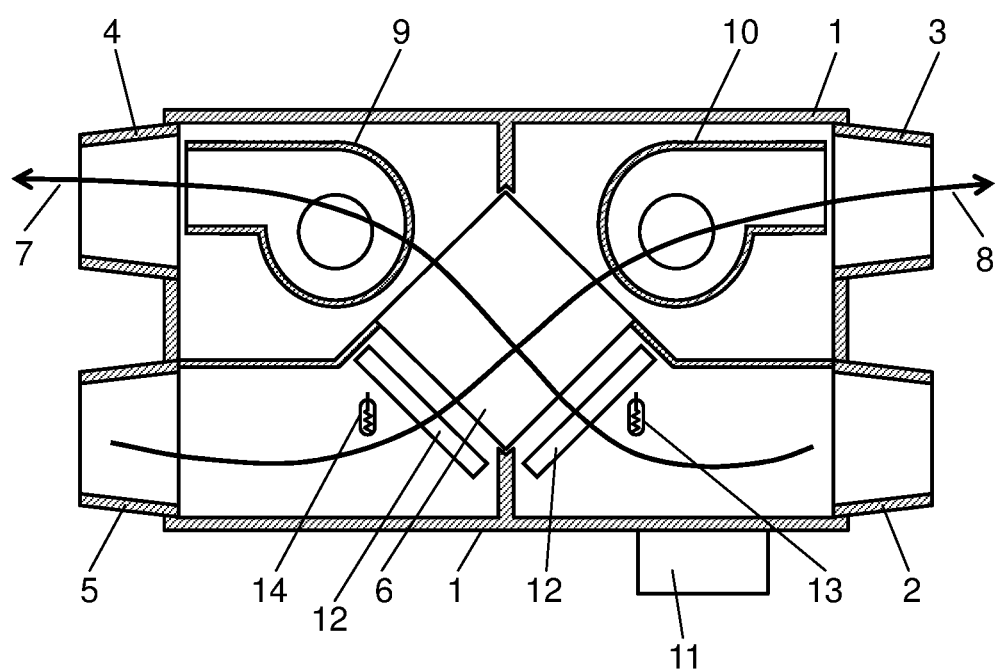
FIG. 1 is a schematic view illustrating a heat exchanger ventilator according to a first exemplary embodiment of the present invention.

A heat exchanger ventilator according to a first exemplary embodiment of the present invention will be described with reference to FIG. 1. As shown in FIG. 1, in heat exchanger ventilator 1, outdoor air suction port 2 and indoor air exhaust port 3 are provided on a side surface of a box-shaped body, while outdoor air supply port 4 and indoor air suction port 5 are provided on another side surface opposite to the side surface.

On interior or exterior of heat exchanger ventilator 1, controller 11 is provided for controlling speed of an air supply motor of air supply fan 9 and an air exhaust motor of air exhaust fan 10.

In addition, heat exchanger ventilator 1 includes supply air conduit 7 along which fresh outdoor air (supply air) enters from outdoor air suction port 2 on the side surface, passes through heat exchange element 6 disposed inside heat exchanger ventilator 1, and flows into indoors from outdoor air supply port 4.

Furthermore, heat exchanger ventilator 1 includes exhaust air conduit 8 along which foul indoor air (exhaust air) enters from indoor air suction port 5, passes through heat exchange element 6 disposed inside heat exchanger ventilator 1, and flows into outdoors from indoor air exhaust port 3. Fresh outdoor air (supply air) entering from outdoor air suction port 2 and foul indoor air (exhaust air) entering from indoor air suction port 5 respectively flow into supply air conduit 7 and exhaust air conduit 8 through operations of air supply fan 9 and air exhaust fan 10.

Heat exchange element 6 disposed at a position where supply air conduit 7 and exhaust air conduit 8 intersect has a heat recovery function for adding heat of air to be exhausted to air to be supplied, or for adding heat of air to be supplied to air to be exhausted. In addition, air cleaning filters 12 are respectively disposed at positions upstream of heat exchange element 6 in supply air conduit 7 and exhaust air conduit 8.

In addition, in supply air conduit 7, temperature detection unit 13 is disposed at a position upstream of heat exchange element 6 and facing outdoor air suction port 2, and, in exhaust air conduit 8, humidity detection unit 14 is disposed at another position upstream of heat exchange element 6 and facing indoor air suction port 5.

In addition, outdoor air suction port 2, indoor air exhaust port 3, outdoor air supply port 4, and indoor air suction port 5 respectively are shaped so that ducts (not shown) are coupled. Ducts coupled to outdoor air suction port 2 and indoor air exhaust port 3 are routed to an exterior wall surface of the building to allow air to communicate with outdoor air of the building. Other ducts coupled to outdoor air supply port 4 and indoor air suction port 5 are routed to a ceiling surface or a wall surface of a living space to allow air to communicate with indoor air.

Controller 11 controls speed of the air supply motor of air supply fan 9 and the air exhaust motor of air exhaust fan 10 to keep a supply air flow rate and an exhaust air flow rate constant.

An operation of controller 11, which is a feature of this exemplary embodiment, will be described.

When heat exchanger ventilator 1 starts, controller 11 controls speed of the air supply motor and the air exhaust motor so that flow rates of air to be output by air supply fan 9 and air exhaust fan 10 are even (air heat exchange operation).

However, if an outdoor air temperature lowers during an air heat exchange operation, moisture begins condensing in heat exchange element 6 in exhaust air conduit 8. This condensation is caused when indoor air (exhaust air) flowing into exhaust air conduit 8 exchanges heat with outdoor air (supply air) inside heat exchange element 6, and a temperature of the air lowers equal to or below a dew point. In other words, this condensation is caused by the indoor air (exhaust air) flowing into exhaust air conduit 8, which contains moisture equal to or above an amount of saturated water vapor at a temperature after heat is exchanged. The condensed moisture freezes when a temperature of exhaust air after heat is exchanged is below 0° C., where the frozen moisture causes heat exchange element 6 to clog to lower a ventilation function.

Furthermore, when the operation continues, moisture further freezes to result in a larger amount of frozen moisture. The frozen moisture melts when an outdoor air temperature rises, and overflows from heat exchanger ventilator 1. The overflowed water could leave a negative effect in an installation location, including an insulation failure due to a water leakage.

To avoid such an event, controller 11 monitors temperature T detected by temperature detection unit 13 provided on a supply air inlet side of heat exchange element 6, and humidity H detected by humidity detection unit 14 provided on an exhaust air inlet side of heat exchange element 6, and, in conformity to predetermined set values, lowers a supply air flow rate and an exhaust air flow rate. In other words, controller 11 reduces a speed of the air supply motor of air supply fan 9 and a speed of the air exhaust motor of air exhaust fan 10.

The operation will specifically be described.

When outdoor air temperature T detected by temperature detection unit 13 is equal to or above first predetermined temperature $T_1$ (for example, 5° C.), a supply air flow rate and an exhaust air flow rate are switched to predetermined air flow rate A (for example, 200 m$^3$/h, respectively) for operation.

A case when this operation state continues, and an outdoor air temperature gradually lowers will be described. When an outdoor air temperature lowers below set first predetermined temperature $T_1$, temperature detection unit 13 detects the lowered temperature.

When temperature T detected by temperature detection unit 13 is below first predetermined temperature $T_1$, but is equal to or above second predetermined temperature $T_2$ (for example, 0° C.) (when $T_2 \leq T < T_1$ is satisfied), humidity detection unit 14 checks indoor humidity H.

When humidity H detected by humidity detection unit 14 falls within a first predetermined humidity range (for example, equal to or above 0%, and below 50%), controller 11 reduces speed of the air supply motor and the air exhaust motor so that a predefined first $A_1$ supply air flow rate (for example, 175 m³/h) and a predefined first $A_1$ exhaust air flow rate (for example, 175 m³/h) are attained. In addition, when humidity H detected by humidity detection unit 14 falls within a second predetermined humidity range (for example, equal to or above 50%, and below 100%), controller 11 reduces speed of the air supply motor and the air exhaust motor so that a predefined first $A_2$ supply air flow rate (for example, 150 m³/h) and a predefined first $A_2$ exhaust air flow rate (for example, 150 m³/h) are attained.

At this time, a maximum value of the first predetermined humidity range<a minimum value of the second predetermined humidity range, the first $A_1$ supply air flow rate>the first $A_2$ supply air flow rate, and the first $A_1$ exhaust air flow rate>the first $A_2$ exhaust air flow rate are satisfied.

The first $A_1$ supply air flow rate and the first $A_1$ exhaust air flow rate respectively are air flow rates obtained and defined through experiments, where, when detected temperature T satisfies $T_2 \leq T < T_1$, and detected humidity H falls within the first predetermined humidity range, by assuming a predetermined indoor temperature (for example, JIS B 8628), where no moisture condenses on a heat exchange element. In addition, the first $A_2$ supply air flow rate and the first $A_2$ exhaust air flow rate respectively are air flow rates obtained and defined through experiments, where, when detected temperature T satisfies $T_2 \leq T < T_1$, and detected humidity H falls within the second predetermined humidity range, by assuming a predetermined indoor temperature (for example, JIS B 8628), where no moisture condenses on a heat exchange element.

When an outdoor air temperature lowers, moisture condenses and freezes in heat exchange element 6 in exhaust air conduit 8. However, a temperature at which moisture condenses and freezes and total heat exchange efficiency depend on flow rates of supply air and exhaust air flowing through heat exchange element 6, a heat exchange capability of heat exchange element 6 itself, and indoor humidity. That is, since the lower a flow rate and the higher a heat exchange capability, the higher a temperature of exhaust air after heat is exchanged and the more an amount of saturated water vapor, exhaust air is able to retain more moisture, and thus a risk of condensed moisture increases. However, since the less indoor humidity, the less an amount of moisture retained by exhaust air, a risk of condensed moisture lowers.

For example, when flow rates of supply air and exhaust air passing through heat exchange element 6 are remarkably smaller, total heat exchange efficiency increases. As a result, even if indoor humidity is higher, most of moisture retained by indoor air (exhaust air) after heat is exchanged might sometimes be taken by outdoor air (supply air). In this case, even if an element temperature on an exhaust air outlet side of heat exchange element 6 in exhaust air conduit 8 lowers equal to or below 0° C., only a tiny amount of frozen moisture would be identified. As described above, it can be said that factors for determining an outdoor air temperature at which moisture condenses are an air flow rate, exchange efficiency based on the air flow rate, and indoor humidity.

In addition, when controller 11 detects that a temperature detected by temperature detection unit 13 is below a first predetermined temperature, controller 11 reduces speed of the air supply motor and the air exhaust motor. After that, when controller 11 detects that a temperature detected by temperature detection unit 13 is below an n-th (n is an integer equal to or above 2) predetermined temperature, controller 11 may stop the air supply motor from rotating, without stopping the air exhaust motor from rotating, to continue a ventilation operation only with an exhaust air operation. At this point, the n-th predetermined temperature<the first predetermined temperature is satisfied. Therefore, until immediately before moisture freezes, an air heat exchange operation with a supply air operation and an exhaust air operation can be continued, and, in an extremely low temperature range, an operation can be switched to only an exhaust air operation to continue a ventilation operation.

In addition, controller 11 may lower a supply air flow rate and an exhaust air flow rate in a step-wise manner in accordance with a detected temperature and detected humidity to prevent moisture from condensing to continue an air heat exchange operation. That is, after controller 11 detects that a temperature detected by temperature detection unit 13 is below the first predetermined temperature, and before controller 11 detects that a temperature detected by temperature detection unit 13 is below an n-th predetermined temperature (n is an integer equal to or above 3), when controller 11 detects that a temperature detected by temperature detection unit 13 is below a k-th (k=is an any integer of 2, 3, . . . , or n−1) predetermined temperature, controller 11 takes actions as described below. That is, when humidity detected by humidity detection unit 14 falls within the first predetermined humidity range, controller 11 keeps or reduces speed of the air supply motor and the air exhaust motor so that a predefined k-th $A_1$ supply air flow rate and a predefined k-th $A_1$ exhaust air flow rate are attained. When humidity detected by humidity detection unit 14 falls within the second predetermined humidity range, controller 11 keeps or reduces speed of the air supply motor and the air exhaust motor so that a predefined k-th $A_2$ supply air flow rate and a predefined k-th $A_2$ exhaust air flow rate are attained. At this time, the n-th predetermined temperature<the k-th predetermined temperature<the first predetermined temperature, the k-th $A_1$ supply air flow rate≤the first $A_1$ supply air flow rate, the k-th $A_1$ exhaust air flow rate≤the first $A_1$ exhaust air flow rate, the k-th $A_1$ supply air flow rate>the k-th $A_2$ supply air flow rate, and the k-th $A_1$ exhaust air flow rate>the k-th $A_2$ exhaust air flow rate are satisfied.

Figure 2:
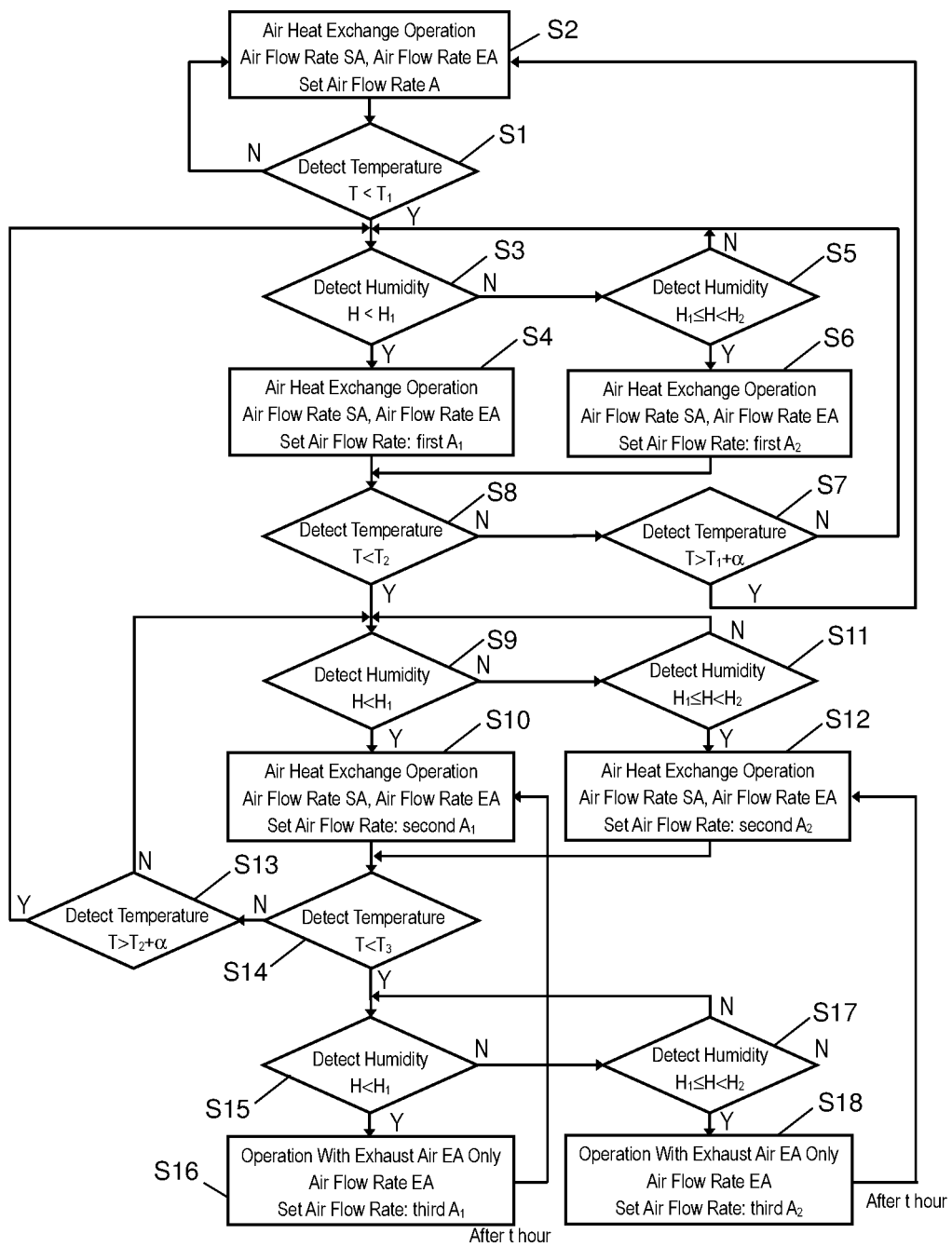
FIG. 2 is a flowchart for a controller of the heat exchanger ventilator according to the first exemplary embodiment of the present invention.

FIG. 2 is a flowchart illustrating a flow of the above described control performed by controller 11 when n=3. The control will be described one by one.

When temperature T detected by temperature detection unit 13 is equal to or above first predetermined temperature $T_1$ (for example, 5° C.), a supply air flow rate (air flow rate SA) and an exhaust air flow rate (air flow rate EA) respectively are switched to set air flow rate A (for example, 200 m³/h, respectively) to continue an operation (step S1, step S2).

When an outdoor air temperature lowers, and temperature T detected by temperature detection unit 13 is below first predetermined temperature $T_1$ (for example, 5° C.), humidity detection unit 14 detects indoor humidity H (step S1).

When indoor humidity H satisfies $H < H_1$ (for example, H<50%), speed of the air supply motor and the air exhaust motor are reduced so that a supply air flow rate and an exhaust air flow rate respectively attain the first $A_1$ supply air flow rate and the first $A_1$ exhaust air flow rate (for example, 175 m³/h, respectively) (step S3, step S4). When indoor humidity H satisfies $H_1 \leq H < H_2$ (for example, 50%≤H<100%), speed of the air supply motor and the air exhaust motor are reduced so that a supply air flow rate and an exhaust air flow rate respectively attain the first $A_2$ supply air flow rate and the first $A_2$ exhaust air flow rate (for example, 150 m³/h, respectively) (step S5, step S6).

Since the higher indoor humidity, the more exhaust air contains moisture, a risk of condensed and frozen moisture increases. Therefore, in order to reduce a risk of condensed and frozen moisture, flow rates should be lowered to increase exchange efficiency to raise a temperature of exhaust air to lower humidity of the exhaust air. The higher a temperature of exhaust air, the higher a dew point temperature and the more the exhaust air can retain moisture. In addition, the lower humidity of exhaust air, the more the exhaust air can retain further moisture.

Through these effects in exhaust air, a risk of condensed and frozen moisture can be reduced.

After temperature T detected by temperature detection unit 13 lowers below first predetermined temperature $T_1$, and an operation is continued at either the first $A_1$ supply air flow rate and the first $A_1$ exhaust air flow rate, or the first $A_2$ supply air flow rate and the first $A_2$ exhaust air flow rate, when detected temperature T becomes a value exceeding predetermined value $T_1+\alpha$, controller 11 performs a control described below. That is, a supply air flow rate and an exhaust air flow rate respectively are switched-back to initially set air flow rate A (for example, 200 m$^3$/h, respectively) (step S7, step S2). A symbol $\alpha$ represents a predetermined value (for example, 3) for providing hysteresis.

Even when an outdoor air temperature further lowers, a control is performed in a similar or identical manner. When temperature T detected by temperature detection unit 13 is below second predetermined temperature $T_2$ (for example, 0° C.), humidity detection unit 14 detects indoor humidity H (step S8).

When indoor humidity H satisfies H<$H_1$ (for example, H<50%), controller 11 keeps or reduces speed of the air supply motor and the air exhaust motor so that a supply air flow rate and an exhaust air flow rate respectively attain a second $A_1$ supply air flow rate and a second $A_1$ exhaust air flow rate (for example, 150 m$^3$/h, respectively) (step S9, step S10). When indoor humidity H satisfies $H_1 \leq H < H_2$ (for example, 50%≤H<100%), controller 11 keeps or reduces speed of the air supply motor and the air exhaust motor so that a supply air flow rate and an exhaust air flow rate respectively attain a second $A_2$ supply air flow rate and a second $A_2$ exhaust air flow rate (for example, 125 m$^3$/h, respectively) (step S11, step S12).

After temperature T detected by temperature detection unit 13 lowers below second predetermined temperature $T_2$, and an operation is continued at either the second $A_1$ supply air flow rate and the second $A_1$ exhaust air flow rate, or the second $A_2$ supply air flow rate and the second $A_2$ exhaust air flow rate, when detected temperature T becomes a value exceeding predetermined value $T_2+\alpha$, controller 11 performs a control described below. That is, a supply air flow rate and an exhaust air flow rate respectively are switched-back to the air flow rates applied one step earlier, which are the first $A_1$ supply air flow rate and the first $A_1$ exhaust air flow rate (for example, 175 m$^3$/h, respectively) or the first $A_2$ supply air flow rate and the first $A_2$ exhaust air flow rate (for example, 150 m$^3$/h, respectively) (step S13, step S4, step S6).

When an outdoor air temperature further lowers, and temperature T detected by temperature detection unit 13 is below third predetermined temperature $T_3$ (for example, −5° C.), humidity detection unit 14 detects indoor humidity H (step S14).

When indoor humidity H satisfies H<$H_1$ (for example, H<50%), controller 11 keeps or reduces a speed of the air exhaust motor so that an exhaust air flow rate attains a third $A_1$ exhaust air flow rate (for example, 125 m$^3$/h) (step S15, step S16). When indoor humidity H satisfies $H_1 \leq H < H_2$ (for example, 50%≤H<100%), controller 11 keeps or reduces a speed of the air exhaust motor so that an exhaust air flow rate attains a third $A_2$ exhaust air flow rate (for example, 100 m$^3$/h) (step S17, step S18). In a case described above, only an exhaust air operation is performed, where the air supply motor is stopped.

Since, when temperature T detected by temperature detection unit 13 lowers to a temperature below third predetermined temperature $T_3$, a temperature of exhaust air lowers equal to or below 0° C. even at an extremely lower air flow rate, a risk of freezing remarkably arises. In such a low temperature range, conventionally, a ventilation operation has to be stopped. However, by allowing controller 11 to stop only the air supply fan to perform only an exhaust air operation, a ventilation operation can be continued while preventing outdoor air from entering to prevent moisture from freezing in heat exchange element 6

In addition, since, when only an exhaust air operation is performed, temperature detection unit 13 cannot detect an outdoor air temperature, an operation should appropriately be controlled in conformity to an outdoor air temperature by periodically (in FIG. 2, after t hour(s)) operating the air supply fan to switch-back to an air heat exchange operation (step S16, step S10, step S18, step S12).

As described above, desired n-th predetermined temperature $T_n$ (for example, n=3) at which only an exhaust air operation has to be performed should be defined, and, per indoor humidity (H<$H_1$, $H_1 \leq H < H_2$) at predetermined temperature $T_k$ (for example, k=2), set air flow rates (k-th $A_1$ supply air flow rate, k-th $A_1$ exhaust air flow rate, k-th $A_2$ supply air flow rate, and k-th $A_2$ exhaust air flow rate) should be defined. Accordingly, an air heat exchange operation can be performed while keeping air flow rates at which moisture neither condenses nor freezes under an indoor humidity and outdoor temperature condition.

In FIG. 2, n=3 does not mean that the number of steps for detecting a temperature or humidity is only 3, but at least 3. By defining desired steps to further precisely control air flow rates, a more appropriate ventilation operation can be achieved.

In this exemplary embodiment, the third predetermined temperature<the second predetermined temperature<the first predetermined temperature, the third $A_1$ supply air flow rate≤the second $A_1$ supply air flow rate≤the first $A_1$ supply air flow rate, the third $A_1$ exhaust air flow rate≤the second $A_1$ exhaust air flow rate≤the first $A_1$ exhaust air flow rate, the second $A_1$ supply air flow rate>the second $A_2$ supply air flow rate, the second $A_1$ exhaust air flow rate>the second $A_2$ exhaust air flow rate, and the third $A_1$ exhaust air flow rate>the third $A_2$ exhaust air flow rate are satisfied.

Second Exemplary Embodiment

Figure 3:
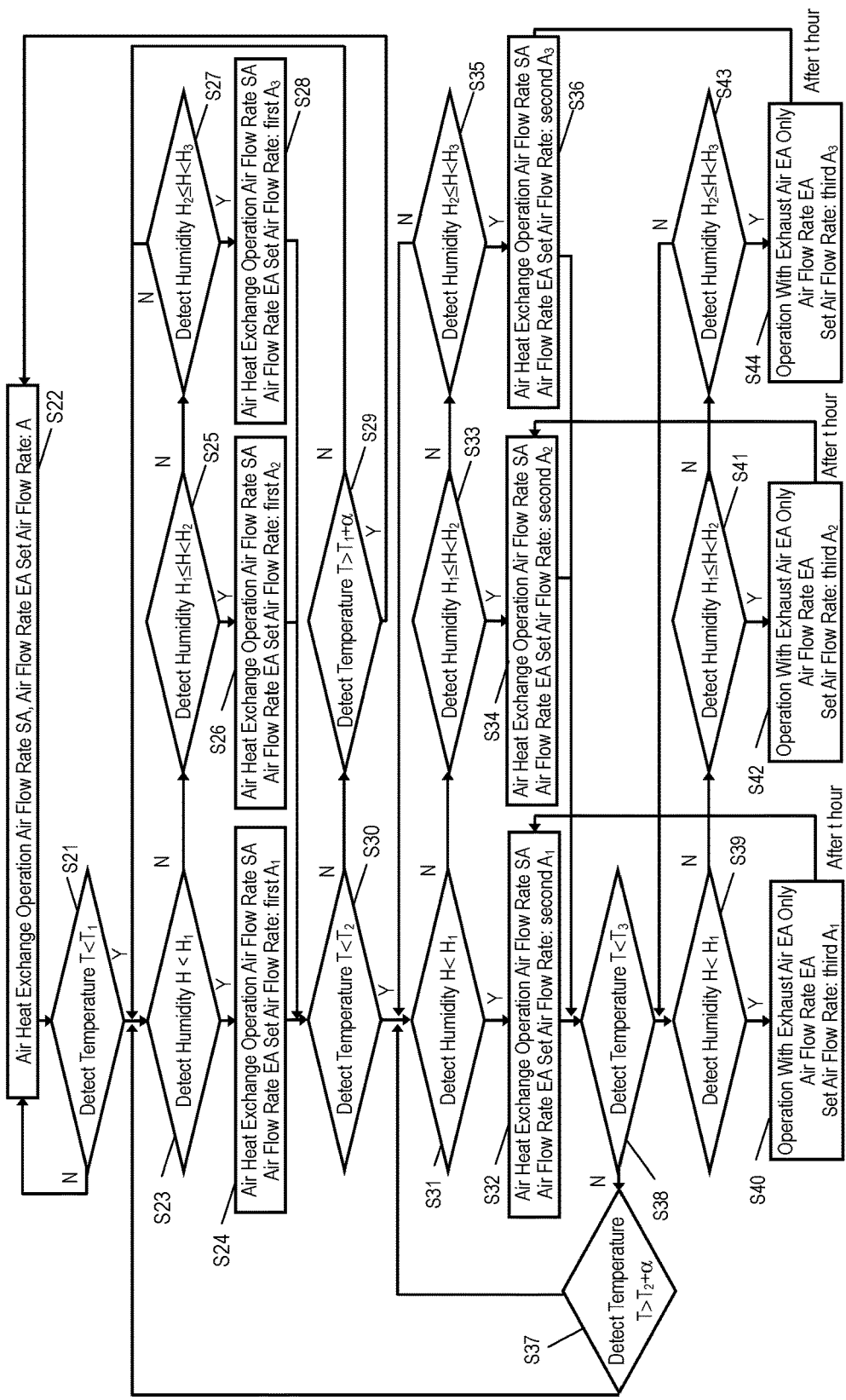
FIG. 3 is a flowchart for a controller of a heat exchanger ventilator according to a second exemplary embodiment of the present invention.

FIG. 3 is a flowchart illustrating a flow of control performed by controller 11, with respect to a heat exchanger ventilator according to a second exemplary embodiment of the present invention.

A major difference between FIG. 3 and FIG. 2 is the number of predetermined humidity ranges. That is, although FIG. 2 includes two predetermined humidity ranges: the first predetermined humidity range (H<$H_1$) and the second predetermined humidity range ($H_1 \leq H < H_2$), FIG. 3 includes three predetermined humidity ranges: a first predetermined humidity range (H<$H_1$), a second predetermined humidity range ($H_1 \leq H < H_2$), and a third predetermined humidity range ($H_2 \leq H < H_3$). A maximum value of the second predetermined humidity range<a minimum value of the third predetermined humidity range is satisfied.

The control will be described one by one.

When temperature T detected by temperature detection unit 13 is equal to or above the first predetermined temperature $T_1$ (for example, 5° C.), a supply air flow rate (air flow rate SA) and an exhaust air flow rate (air flow rate EA) are switched to set air flow rate A (for example, 200 m³/h, respectively) to continue an operation (step S21, step S22).

When an outdoor air temperature lowers, and temperature T detected by temperature detection unit 13 is below first predetermined temperature $T_1$ (for example, 5° C.), humidity detection unit 14 detects indoor humidity H (step S21).

When indoor humidity H satisfies $H<H_1$ (for example, H<30%), controller 11 reduces speed of the air supply motor and the air exhaust motor so that a supply air flow rate and an exhaust air flow rate respectively attain a first $A_1$ supply air flow rate and a first $A_1$ exhaust air flow rate (for example, 175 m³/h, respectively) (step S23, step S24). When indoor humidity H satisfies $H_1 \leq H<H_2$ (for example, 30%≤H<50%), controller 11 reduces speed of the air supply motor and the air exhaust motor so that a supply air flow rate and an exhaust air flow rate respectively attain a first $A_2$ supply air flow rate and a first $A_2$ exhaust air flow rate (for example, 150 m³/h, respectively) (step S25, step S26). When indoor humidity H satisfies $H_2 \leq H<H_3$ (for example, 50%≤H<100%), controller 11 reduces speed of the air supply motor and the air exhaust motor so that a supply air flow rate and an exhaust air flow rate respectively attain a first $A_3$ supply air flow rate and a first $A_3$ exhaust air flow rate (for example, 125 m³/h, respectively) (step S27, step S27, step S28).

Since the higher indoor humidity, the more exhaust air contains moisture, a risk of condensed and frozen moisture increases. Therefore, in order to reduce a risk of condensed and frozen moisture, flow rates should be lowered to increase exchange efficiency to raise a temperature of exhaust air to lower humidity of the exhaust air. The higher a temperature of exhaust air, the higher a dew point temperature and the more the exhaust air can retain moisture. In addition, the lower humidity of exhaust air, the more the exhaust air can retain further moisture.

Through these effects in exhaust air, a risk of condensed and frozen moisture can be reduced.

With the added third predetermined humidity range ($H_2 \leq H<H_3$), an air heat exchange operation can further effectively be continued in a state where moisture is less likely to condense and freeze.

After temperature T detected by temperature detection unit 13 lowers below first predetermined temperature $T_1$, and an operation is continued at either the first $A_1$ supply air flow rate and the first $A_1$ exhaust air flow rate, the first $A_2$ supply air flow rate and the first $A_2$ exhaust air flow rate, or the first $A_3$ supply air flow rate and the first $A_3$ exhaust air flow rate, when detected temperature T becomes a value exceeding predetermined value $T_1+\alpha$, controller 11 performs a control described below. That is, a supply air flow rate and an exhaust air flow rate respectively are switched-back to initially set air flow rate A (for example, 200 m³/h, respectively) (step S29, step S22). A symbol α represents a predetermined value (for example, 3) for providing hysteresis.

Even when an outdoor air temperature further lowers, a control is performed in a similar or identical manner. When temperature T detected by temperature detection unit 13 is below second predetermined temperature $T_2$ (for example 0° C.), humidity detection unit 14 detects indoor humidity H (step S30).

When indoor humidity H satisfies $H<H_1$ (for example, H<30%), controller 11 keeps or reduces speed of the air supply motor and the air exhaust motor so that a supply air flow rate and an exhaust air flow rate respectively attain a second $A_1$ supply air flow rate and a second $A_1$ exhaust air flow rate (for example, 150 m³/h, respectively) (step S31, step S32). When indoor humidity H satisfies $H_1 \leq H<H_2$ (for example, 30%≤H<50%), controller 11 keeps or reduces speed of the air supply motor and the air exhaust motor so that a supply air flow rate and an exhaust air flow rate respectively attain a second $A_2$ supply air flow rate and a second $A_2$ exhaust air flow rate (for example, 125 m³/h, respectively) (step S33, step S34). When indoor humidity H satisfies $H_2 \leq H<H_3$ (for example, 50%≤H<100%), controller 11 keeps or reduces speed of the air supply motor and the air exhaust motor so that a supply air flow rate and an exhaust air flow rate respectively attain a second $A_3$ supply air flow rate and a second $A_3$ exhaust air flow rate (for example, 100 m³/h, respectively) (step S35, step S36).

After temperature T detected by temperature detection unit 13 lowers below second predetermined temperature $T_2$, and an operation is continued at either the second $A_1$ supply air flow rate and the second $A_1$ exhaust air flow rate, the second $A_2$ supply air flow rate and the second $A_2$ exhaust air flow rate, or the second $A_3$ supply air flow rate and the second $A_3$ exhaust air flow rate, when detected temperature T becomes a value exceeding predetermined value $T_2+\alpha$, controller 11 performs a control described below. That is, a supply air flow rate and an exhaust air flow rate respectively are switched-back to the air flow rates applied one step earlier, which are the first $A_1$ supply air flow rate and the first $A_1$ exhaust air flow rate (for example, 175 m³/h, respectively), the first $A_2$ supply air flow rate and the first $A_2$ exhaust air flow rate (for example, 150 m³/h, respectively), or the first $A_3$ supply air flow rate and the first $A_3$ exhaust air flow rate (for example, 125 m³/h, respectively) (step S37, step S24, step S24, step S26, step S28).

When an outdoor air temperature further lowers, and temperature T detected by temperature detection unit 13 is below third predetermined temperature $T_3$ (for example, −5° C.), humidity detection unit 14 detects indoor humidity H (step S38).

When indoor humidity H satisfies $H<H_1$ (for example, H<30%), controller 11 keeps or reduces a speed of the air exhaust motor so that an exhaust air flow rate attains a third $A_1$ exhaust air flow rate (for example, 125 m³/h) (step S39, step S40). When indoor humidity H satisfies $H_1 \leq H<H_2$ (for example, 30%≤H<50%), controller 11 keeps or reduces a speed of the air exhaust motor so that an exhaust air flow rate attains a third $A_2$ exhaust air flow rate (for example, 100 m³/h) (step S41, step S42). When indoor humidity H satisfies $H_2 \leq H<H_3$ (for example, 50%≤H<100%), controller 11 keeps or reduces a speed of the air exhaust motor so that an exhaust air flow rate attains a third $A_3$ exhaust air flow rate (for example, 75 m³/h) (step S43, step S44). In a case described above, only an exhaust air operation is performed, where the air supply motor is stopped.

Since, when temperature T detected by temperature detection unit 13 lowers to a temperature below third predetermined temperature $T_3$, a temperature of exhaust air lowers equal to or below 0° C. even at an extremely lower air flow rate, a risk of freezing remarkably arises. In such a low temperature range, conventionally, a ventilation operation has to be stopped. However, by allowing controller 11 to stop only the air supply fan to perform only an exhaust air operation, a ventilation operation can be continued while preventing outdoor air from entering to prevent heat exchange element from freezing.

In addition, since, when only an exhaust air operation is performed, temperature detection unit 13 cannot detect an outdoor air temperature, an operation should appropriately be controlled in conformity to an outdoor air temperature by periodically (in FIG. 3, after t hour(s)) operating the air supply fan to switch-back to an air heat exchange operation (step S40, step S32, step S42, step S34, step S44, step S36).

As described above, by defining desired n-th predetermined temperatures Tn (for example, n=3) at which only an exhaust air operation has to be performed, and, per indoor humidity ($H<H_1$, $H_1 \leq H<H_2$, $H_2 \leq H<H_3$) at predetermined temperature $T_k$ (for example, k=2), set air flow rates (k-th $A_1$ supply air flow rate, k-th $A_1$ exhaust air flow rate, k-th $A_2$ supply air flow rate, k-th $A_2$ exhaust air flow rate, k-th $A_3$ supply air flow rate, and k-th $A_3$ exhaust air flow rate), an air heat exchange operation can be performed while keeping air flow rates at which moisture neither condenses nor freezes under an indoor humidity and outdoor temperature condition.

In FIG. 3, n=3 does not mean that the number of steps for detecting a temperature or humidity is only 3, but at least 3. By defining desired steps to further precisely control air flow rates, a more appropriate ventilation operation can be achieved.

This exemplary embodiment satisfies the third predetermined temperature<the second predetermined temperature<the first predetermined temperature, the third $A_1$ supply air flow rate≤the second $A_1$ supply air flow rate≤the first $A_1$ supply air flow rate, the third $A_1$ exhaust air flow rate≤the second $A_1$ exhaust air flow rate≤the first $A_1$ exhaust air flow rate, the first $A_1$ supply air flow rate>the first $A_2$ supply air flow rate>the first $A_3$ supply air flow rate, the first $A_1$ exhaust air flow rate>the first $A_2$ exhaust air flow rate>the first $A_3$ exhaust air flow rate, the second $A_1$ supply air flow rate>the second $A_2$ supply air flow rate>the second $A_3$ supply air flow rate, the second $A_1$ exhaust air flow rate>the second $A_2$ exhaust air flow rate>the second $A_3$ exhaust air flow rate, and the third $A_1$ exhaust air flow rate>the third $A_2$ exhaust air flow rate>the third $A_3$ exhaust air flow rate.

A third exemplary embodiment of the present invention will be described with reference to the drawings.

Third Exemplary Embodiment

A heat exchanger ventilator according to the third exemplary embodiment of the present invention will now be described with reference to FIG. 4. Components identical to components of the first exemplary embodiment are applied with identical numbers or symbols to omit duplicated descriptions.

Figure 4:
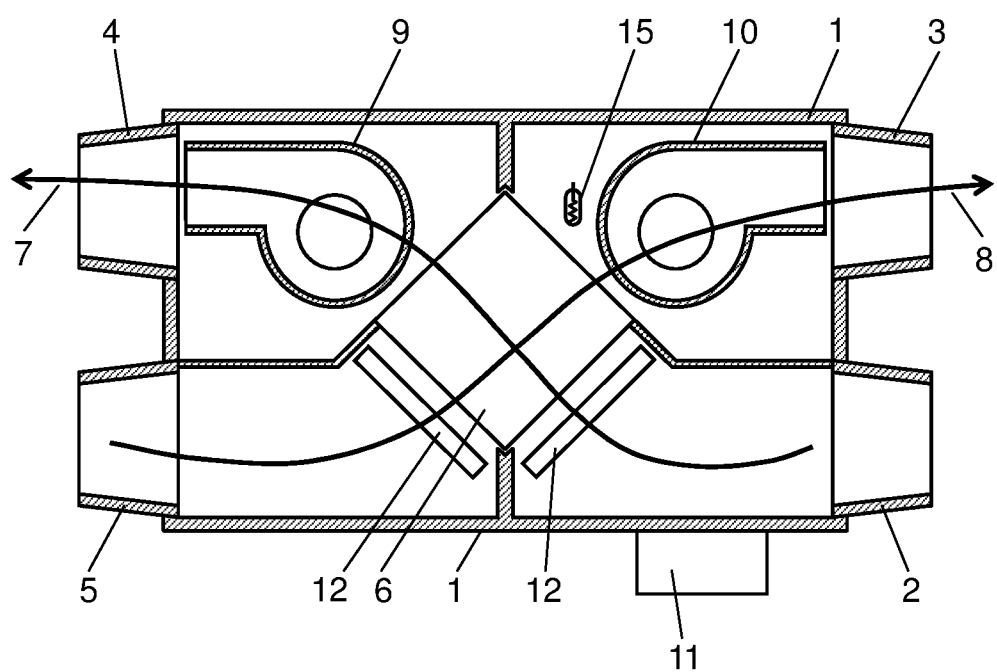
FIG. 4 is a schematic view illustrating a heat exchanger ventilator according to a third exemplary embodiment of the present invention.

As shown in FIG. 4, in heat exchanger ventilator 1, outdoor air suction port 2 and indoor air exhaust port 3 are provided on a side surface of a box-shaped body, while outdoor air supply port 4 and indoor air suction port 5 are provided on another side surface opposite to the side surface.

On interior or exterior of heat exchanger ventilator 1, controller 11 is provided for controlling speed of an air supply motor of air supply fan 9 and an air exhaust motor of air exhaust fan 10.

In addition, heat exchanger ventilator 1 includes supply air conduit 7 along which fresh outdoor air (supply air) enters from outdoor air suction port 2 on the side surface, passes through heat exchange element 6 disposed inside heat exchanger ventilator 1, and flows into indoors from outdoor air supply port 4.

Furthermore, heat exchanger ventilator 1 includes exhaust air conduit 8 along which foul indoor air (exhaust air) enters from indoor air suction port 5, passes through heat exchange element 6 disposed inside heat exchanger ventilator 1, and flows into outdoors from indoor air exhaust port 3. Fresh outdoor air (supply air) entering from outdoor air suction port 2 and foul indoor air (exhaust air) entering from indoor air suction port 5 respectively flow into supply air conduit 7 and exhaust air conduit 8 through operations of air supply fan 9 and air exhaust fan 10.

Heat exchange element 6 disposed at a position where supply air conduit 7 and exhaust air conduit 8 intersect has a heat recovery function for adding heat of air to be exhausted to air to be supplied, or for adding heat of air to be supplied to air to be exhausted. That is, heat exchange element 6 has a function for exchanging heat between exhaust air and supply air. In addition, air cleaning filters 12 are respectively disposed at positions upstream of heat exchange element 6 in supply air conduit 7 and exhaust air conduit 8.

In addition, in exhaust air conduit 8, temperature and humidity detection unit 15 is disposed at a position downstream of heat exchange element 6 and facing indoor air exhaust port 3. Temperature and humidity detection unit 15 detects a temperature and humidity on an exhaust air outlet side of heat exchange element 6.

In addition, outdoor air suction port 2, indoor air exhaust port 3, outdoor air supply port 4, and indoor air suction port 5 respectively are shaped so that ducts (not shown) are coupled. Ducts coupled to outdoor air suction port 2 and indoor air exhaust port 3 are routed to an exterior wall surface of the building to allow air to communicate with outdoor air of the building. Other ducts coupled to outdoor air supply port 4 and indoor air suction port 5 are routed to a ceiling or a wall surface of a living space to allow air to communicate with indoor air.

An operation of controller 11, which is a feature of this exemplary embodiment, will be described.

A control performed by an ordinary heat exchanger ventilator will first be described with reference to components shown in FIG. 4 illustrating this exemplary embodiment.

When the ordinary heat exchanger ventilator starts, controller 11 controls speed of the air supply motor and the air exhaust motor so that flow rates of air to be output by air supply fan 9 and air exhaust fan 10 are even (air heat exchange operation).

However, in the ordinary heat exchanger ventilator, when an outdoor air temperature lowers during the air heat exchange operation, moisture would be likely to condense on heat exchange element 6, sides of which lie in exhaust air conduit 8. This condensation is caused when indoor air (exhaust air) flowing into exhaust air conduit 8 exchanges heat with outdoor air (supply air) inside heat exchange element 6, and a temperature of the air lowers equal to or below a dew point. In other words, this condensation is caused by the indoor air flowing into exhaust air conduit 8, which contains moisture equal to or above an amount of saturated water vapor at a temperature after heat is exchanged.

The condensed moisture freezes when a temperature of exhaust air after heat is exchanged is below 0° C., where the frozen moisture causes heat exchange element 6 to clog to lower a ventilation function.

Furthermore, when the operation continues, moisture further freezes to result in a larger amount of frozen moisture. The frozen moisture melts when an outdoor air temperature rises, and overflows from heat exchanger ventilator. The overflowed water could leave a negative effect in an installation location, including an insulation failure due to a water leakage.

To avoid such an event, heat exchanger ventilator 1 according to this exemplary embodiment performs a control as described below.

Controller 11 first calculates a first dew point temperature based on a temperature and humidity detected by temperature and humidity detection unit 15 provided, in exhaust air conduit 8, at a position downstream of heat exchange element 6 and facing indoor air exhaust port 3.

Controller 11 monitors, after calculating the first dew point temperature, a temperature detected by temperature and humidity detection unit 15, and keeps, when the temperature is equal to or above the first dew point temperature, a speed of the air supply motor of air supply fan 9 and a speed of the air exhaust motor of air exhaust fan 10. When a temperature lowers below the first dew point temperature, controller 11 reduces a speed of the air supply motor of air supply fan 9 and a speed of the air exhaust motor of air exhaust fan 10 to lower air flow rates.

The operation will specifically be described with reference to FIG. 5.

When heat exchanger ventilator 1 starts, controller 11 controls speed of the air supply motor and the air exhaust motor so that flow rates of air to be output by air supply fan 9 and air exhaust fan 10 are even (air heat exchange operation).

Controller 11 calculates a temperature (first dew point temperature $T_1$), at which moisture condenses, of air in an area on a side, facing indoor air exhaust port 3, of heat exchange element 6 based on a temperature and humidity detected by temperature and humidity detection unit 15 provided, in exhaust air conduit 8, at a position downstream of heat exchange element 6 and facing indoor air exhaust port 3.

When temperature T detected by temperature and humidity detection unit 15 (for example, 10° C.) is equal to or above first dew point temperature $T_1$ (for example, 9° C.), an operation is performed at a supply air flow rate and an exhaust air flow rate respectively switched to set air flow rate A (for example, 100 m$^3$/h, respectively) (step S51, step S52).

A case when this operation state continues, and an outdoor air temperature gradually lowers will be described. When an outdoor air temperature lowers, it is detected that temperature T detected by temperature and humidity detection unit 15 (for example, 8° C.) is below set first dew point temperature $T_1$ (for example, 9° C.) ($T<T_1$) (step S51).

In such a case, controller 11 reduces speed of the air supply motor and the air exhaust motor so that a predefined first A supply air flow rate (for example, 90 m$^3$/h) and a predefined first A exhaust air flow rate (for example, 90 m$^3$/h) are attained (step S53).

Next, after a predetermined period of time has passed, controller 11 calculates a temperature (second dew point temperature $T_2$ (for example, 7° C.)), at which moisture condenses, of air in an area on a side, facing indoor air exhaust port 3, of heat exchange element 6 based on a temperature and humidity detected by temperature and humidity detection unit 15 provided, in exhaust air conduit 8, at a position downstream of heat exchange element 6 and facing indoor air exhaust port 3.

After temperature T detected by temperature and humidity detection unit 15 lowers below first dew point temperature $T_1$, and an operation is continued at the first A supply air flow rate and the first A exhaust air flow rate, when detected temperature T becomes a value exceeding a predetermined value $T_2+\alpha$ ($T>T_2+\alpha$), the supply air flow rate and the exhaust air flow rate respectively are switched-back to initially set air flow rate A (for example, 100 m$^3$/h, respectively) (step S54, step S52). A symbol $\alpha$ represents a predetermined value for providing hysteresis.

In addition, when temperature T detected by temperature and humidity detection unit 15 satisfies ($T_2 \leq T \leq T_2+\alpha$), controller 11 controls speed of the air supply motor and the air exhaust motor so that the first A supply air flow rate (for example, 90 m$^3$/h) and the first A exhaust air flow rate (for example, 90 m$^3$/h) are kept maintained (step S55, step S54, step S53).

When an outdoor air temperature further lowers, and it is detected that temperature T detected by temperature and humidity detection unit 15 (for example, 6° C.) is below set second dew point temperature $T_2$ (for example, 7° C.) ($T<T_2$), controller 11 reduces speed of the air supply motor and the air exhaust motor so that a predefined second A supply air flow rate (for example, 80 m$^3$/h) and a second A exhaust air flow rate (for example, 80 m$^3$/h) are attained (step S55, step S56).

As described above, according to this exemplary embodiment, even when moisture would be likely to condense on heat exchange element 6, a supply air flow rate and an exhaust air flow rate are lowered to increase heat exchange efficiency of heat exchange element 6. Therefore, a temperature on an exhaust air side of heat exchange element 6 can be raised to lower humidity on the exhaust air side of heat exchange element 6. Therefore, while preventing moisture from condensing or freezing on a side, in exhaust air conduit 8, downstream of heat exchange element 6 and facing indoor air exhaust port 3, an operation for exchanging heat between supply air and exhaust air can be continued.

Apart from the flowchart shown in FIG. 5, a case when an outdoor air temperature further lowers will be described. When an outdoor air temperature further lowers, a risk of condensed or frozen moisture further increases in heat exchange element 6 in exhaust air conduit 8.

A temperature at which moisture condenses or freezes depends on flow rates of supply air and exhaust air flowing into heat exchange element 6, heat exchange efficiency of heat exchange element 6 itself, and indoor humidity. That is, the lower flow rates of supply air and exhaust air flowing through heat exchange element 6 and the higher heat exchange efficiency, the higher a temperature of the exhaust air after heat is exchanged and the greater an amount of saturated water vapor in the exhaust air after heat is exchanged. Therefore, air on the exhaust air outlet side of heat exchange element 6 will be able to retain more moisture as a water vapor, and a risk of condensed moisture in heat exchange element 6 thus lowers. In addition, since the lower indoor humidity, the less an amount of retained moisture in exhaust air, a risk of condensed moisture further lowers.

For example, when flow rates of supply air and exhaust air passing through heat exchange element 6 are remarkably small, total heat exchange efficiency significantly increases. As a result, even if indoor humidity is high, most of moisture retained by indoor air (exhaust air) after heat is exchanged might sometimes be taken by outdoor air (supply air).

In this case, even when an element temperature at a position, in exhaust air conduit 8, downstream of heat exchange element 6 and facing indoor air exhaust port 3 lowers equal to or below 0° C., only a tiny amount of frozen moisture would be identified. As described above, factors for determining a temperature at which moisture condenses or freezes can be flow rates of supply air and exhaust air, heat exchange efficiency of a heat exchange element, and indoor humidity.

Figure 5:
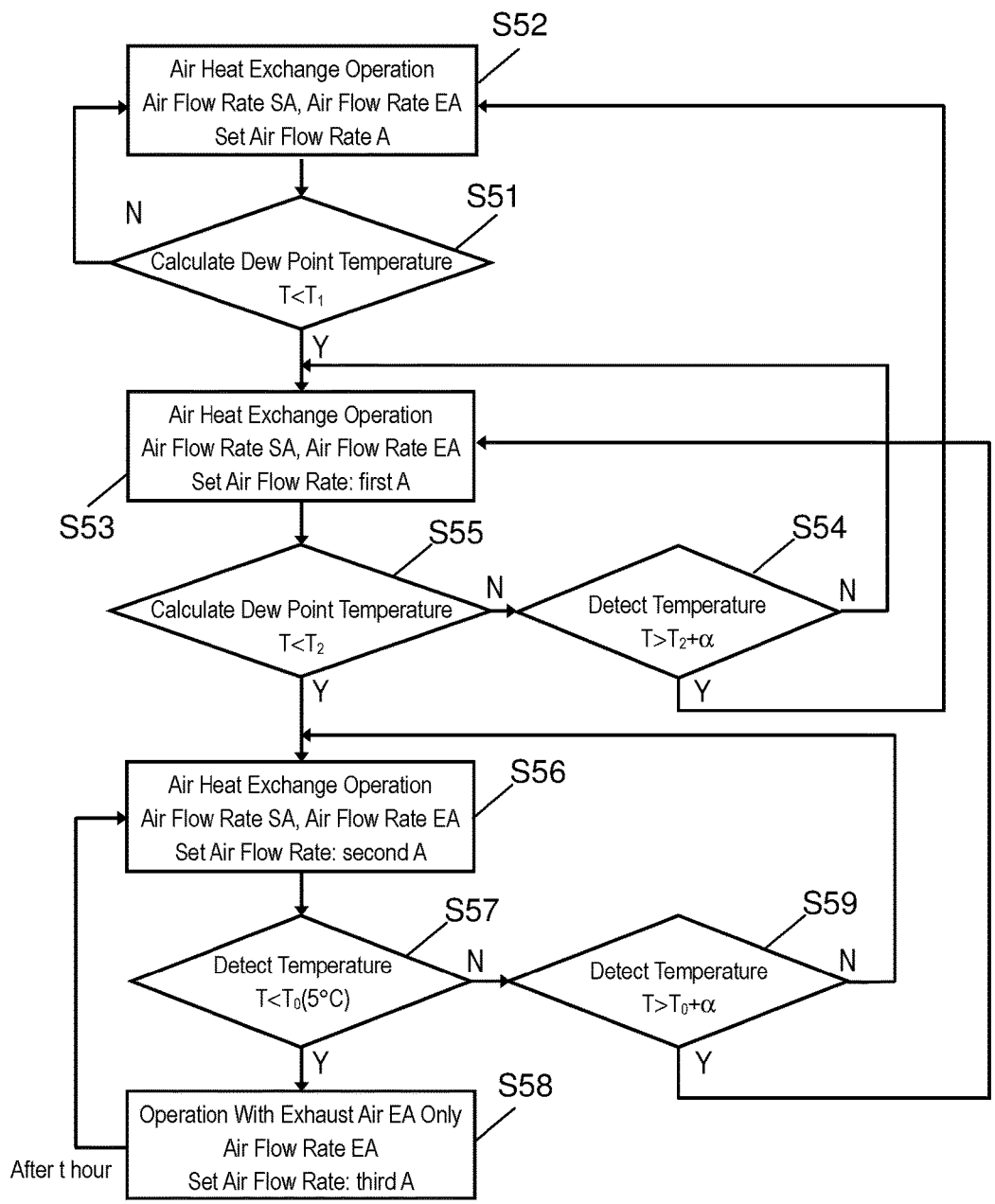
FIG. 5 is a flowchart for a controller of the heat exchanger ventilator according to the third exemplary embodiment of the present invention.
Figure 6:
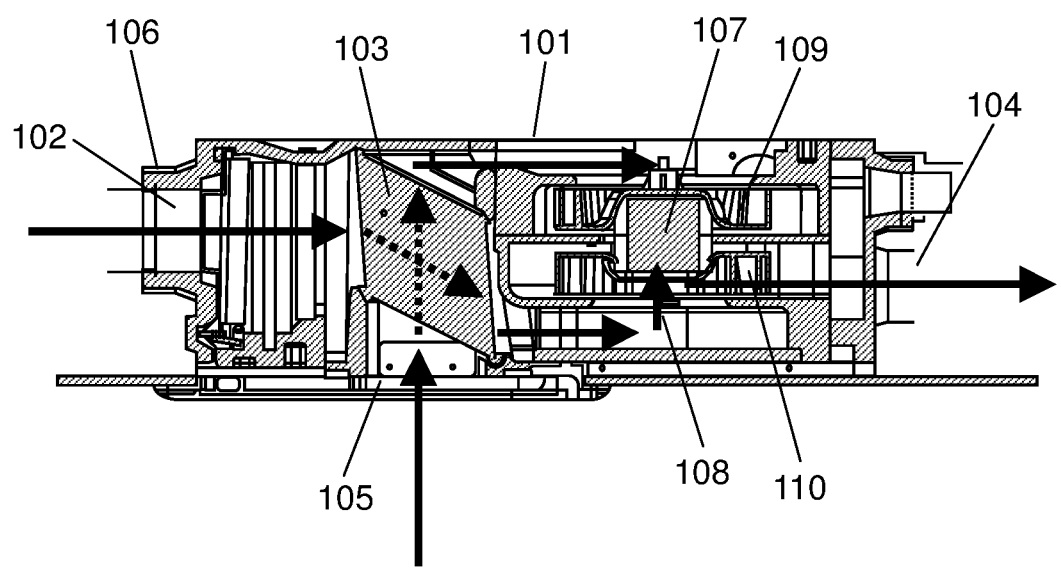
FIG. 6 is a cross-sectional block diagram of a conventional heat exchanger ventilator.

Now back to the flowchart shown in FIG. 5. As described above, when ($T<T_2$) is detected, controller 11 reduces speed of the air supply motor and the air exhaust motor so that the second A supply air flow rate (for example, 80 m³/h) and the second A exhaust air flow rate (for example, 80 m³/h) are attained (step S55, step S56).

Next, after a predetermined period of time has passed, when controller 11 detects that temperature T detected by temperature and humidity detection unit 15 is below predefined freezing warning temperature $T_0$ (for example, 0° C. to 6° C. inclusive, and, in this exemplary embodiment, 5° C.) ($T<T_0$), controller 11 may forcibly stop the air supply motor from rotating, without stopping the air exhaust motor from rotating, to continue a ventilation operation only with an exhaust air operation (third A exhaust air flow rate (for example, 70 m³/h)) (step S57, step S58). Even if a speed of the air exhaust motor has not been reduced, the air supply motor stops rotating, and the third A exhaust air flow rate lowers accordingly in general.

Therefore, until immediately before moisture freezes in heat exchange element 6, an air heat exchange operation with a supply air operation and an exhaust air operation can be continued, and, in an extremely low temperature range, an operation can be switched to only an exhaust air operation to continue a ventilation operation.

When, after ($T<T_2$) is detected, detected temperature T becomes a value exceeding predetermined value $T_0+\alpha$ ($T>T_0+\alpha$), a supply air flow rate and an exhaust air flow rate respectively are switched-back to the first A supply air flow rate (for example, 90 m³/h) and the first A exhaust air flow rate (for example, 90 m³/h) (step S59, step S53). A symbol $\alpha$ represents a predetermined value for providing hysteresis.

In addition, when temperature T detected by temperature and humidity detection unit 15 satisfies ($T_0 \leq T \leq T_0+\alpha$), controller 11 controls speed of the air supply motor and the air exhaust motor so that the second A supply air flow rate (for example, 80 m³/h) and the second A exhaust air flow rate (for example, 80 m³/h) are kept.

In addition, since, after ($T<T_0$) is detected, when only an exhaust air operation is performed, temperature and humidity detection unit 15 cannot detect an effect due to an outdoor air temperature, an operation should appropriately be controlled by periodically (in FIG. 2, after t hour(s)) operating the air supply fan to switch-back to an air heat exchange operation.

In addition, when controller 11 detects that a temperature detected by temperature and humidity detection unit 15 is below freezing warning temperature $T_0$ ($T<T_0$), controller 11 may be configured to increase a speed of the air exhaust motor to continue a ventilation operation only with an exhaust air operation.

Therefore, even if moisture freezes on an outlet portion on an exhaust side of the heat exchange element, the frozen state can promptly be solved. Even if moisture condenses on the outlet portion on the exhaust side of the heat exchange element, the condensed state can also promptly be solved.

In addition, in this exemplary embodiment, controller 11 controls speed of the air supply motor of air supply fan 9 and the air exhaust motor of air exhaust fan 10 to keep a supply air flow rate and an exhaust air flow rate constant. However, a supply air flow rate and an exhaust air flow rate may be controlled so that other air flow rates are attained.

In addition, in the flowchart shown in FIG. 5, controller 11 calculates dew point temperatures twice. However, an effect of this exemplary embodiment can be achieved by calculating a dew point temperature at least once.

In addition, dew point temperatures may be calculated three times or more.

As described above, the heat exchanger ventilator includes the air supply fan equipped with the air supply motor, the air exhaust fan equipped with the air exhaust motor, the supply air conduit along which air is sent from outdoors to indoors by the air supply fan, and the exhaust air conduit along which air is sent from indoors to outdoors by the air exhaust fan. In addition, at a position where the supply air conduit and the exhaust air conduit intersect, the heat exchange element is provided for exchanging heat between indoor air and outdoor air while ventilation. In addition, in the supply air conduit, a temperature detection unit is provided at a position upstream of the heat exchange element, and, in the exhaust air conduit, a humidity detection unit is provided at a position upstream of the heat exchange element. In addition, the air supply motor and the air exhaust motor are controlled for operations and speed by a controller. In addition, when a temperature detected by the temperature detection unit is below the first predetermined temperature, and humidity detected by the humidity detection unit falls within the first predetermined humidity range, the controller reduces speed of the air supply motor and the air exhaust motor so that the predefined first $A_1$ supply air flow rate and the predefined first $A_1$ exhaust air flow rate are attained. In addition, when humidity detected by the humidity detection unit falls within the second predetermined humidity range, the controller reduces speed of the air supply motor and the air exhaust motor so that the predefined first $A_2$ supply air flow rate and the predefined first $A_2$ exhaust air flow rate are attained. Furthermore, a maximum value of the first predetermined humidity range<a minimum value of the second predetermined humidity range, the first $A_1$ supply air flow rate>the first $A_2$ supply air flow rate, and the first $A_1$ exhaust air flow rate>the first $A_2$ exhaust air flow rate are satisfied.

Therefore, by increasing exchange efficiency to raise a temperature on the exhaust air side of the heat exchange element to lower humidity, an operation for exchanging heat between supply air and exhaust air can be continued while preventing moisture from condensing and freezing on the outlet portion on the exhaust air side of the heat exchange element.

In addition, the controller has detected that a temperature detected by the temperature detection unit is below the first predetermined temperature, and has reduced speed of the air supply motor and the air exhaust motor. After that, when the controller has detected that a temperature detected by the temperature detection unit is below an n-th (n is an integer equal to or above 2) predetermined temperature, the controller may perform a control described below. That is, the controller stops the air supply motor from rotating, without stopping the air exhaust motor from rotating, to continue a ventilation operation only with an exhaust air operation so as to satisfy the n-th predetermined temperature<the first predetermined temperature.

Therefore, an effect can be achieved, where, when a heat exchange operation is continued, a ventilation operation can be continued without allowing moisture to freeze on the heat exchange element by stopping the air supply motor to switch an operation only with an exhaust air operation at an outdoor air temperature (n-th predetermined temperature) or below, at which moisture freezes on the heat exchange element.

In addition, after the temperature detection unit detects that a temperature detected by the temperature detection unit is below the first predetermined temperature, and before the temperature detection unit detects that a temperature detected by the temperature detection unit is below the n-th predetermined temperature, where n is an integer equal to or above 3, when the temperature detection unit detects that a temperature detected by the temperature detection unit is below a k-th (k=an any integer of 2, 3, . . . , or n−1) predetermined temperature, the controller may perform a control described below. That is, when humidity detected by the humidity detection unit falls within the first predetermined humidity range, the controller keeps or reduces speed of the air supply motor and the air exhaust motor so that a predefined k-th $A_1$ supply air flow rate and a predefined k-th $A_1$ exhaust air flow rate are attained. In addition, when humidity detected by the humidity detection unit falls within the second predetermined humidity range, the controller keeps or reduces speed of the air supply motor and the air exhaust motor so that a predefined k-th $A_2$ supply air flow rate and a predefined k-th $A_2$ exhaust air flow rate are attained. Furthermore, the n-th predetermined temperature<the k-th predetermined temperature<the first predetermined temperature, the k-th $A_1$ supply air flow rate≤the first $A_1$ supply air flow rate, the k-th $A_1$ exhaust air flow rate≤the first $A_1$ exhaust air flow rate, the k-th $A_1$ supply air flow rate>the k-th $A_2$ supply air flow rate, and the k-th $A_1$ exhaust air flow rate>the k-th $A_2$ exhaust air flow rate are satisfied.

Therefore, an effect can be achieved, where, in order to precisely control, based on an outdoor air temperature lowering to another outdoor air temperature (n-th predetermined temperature) at which only an exhaust air operation is selected, and an indoor humidity, the motors to achieve appropriate air flow rates at which moisture neither condenses nor freezes on the exhaust air side of the heat exchange element, maximum air flow rates under a temperature and humidity condition for an air heat exchange operation with a supply air operation and an exhaust air operation can be kept until further immediately before moisture condenses or freezes on the heat exchange element.

In addition, when n=3, after the controller detects that a temperature detected by the temperature detection unit is below the first predetermined temperature, and before the controller detects that a temperature detected by the temperature detection unit is below the third predetermined temperature, when the controller detects that a temperature detected by the temperature detection unit is below the second predetermined temperature, the controller may perform a control described below. That is, when humidity detected by the humidity detection unit falls within the first predetermined humidity range, the controller keeps or reduces speed of the air supply motor and the air exhaust motor so that the predefined second $A_1$ supply air flow rate and the predefined second $A_1$ exhaust air flow rate are attained. In addition, when humidity detected by the humidity detection unit falls within the second predetermined humidity range, the controller keeps or reduces speed of the air supply motor and the air exhaust motor so that the predefined second $A_2$ supply air flow rate and the predefined second $A_2$ exhaust air flow rate are attained. Furthermore, the third predetermined temperature<the second predetermined temperature<the first predetermined temperature, the second $A_1$ supply air flow rate≤the first $A_1$ supply air flow rate, the second $A_1$ exhaust air flow rate≤the first $A_1$ exhaust air flow rate, the second $A_1$ supply air flow rate>the second $A_2$ supply air flow rate, and the second $A_1$ exhaust air flow rate>the second $A_2$ exhaust air flow rate are satisfied.

In addition, when a temperature detected by the temperature detection unit is below the first predetermined temperature, the controller may perform a control described below. That is, when humidity detected by the humidity detection unit falls within the third predetermined humidity range, the controller reduces speed of the air supply motor and the air exhaust motor so that the predefined first $A_3$ supply air flow rate and the predefined first $A_3$ exhaust air flow rate are attained. Furthermore, the maximum value of the second predetermined humidity range<the minimum value of the third predetermined humidity range, the first $A_1$ supply air flow rate>the first $A_2$ supply air flow rate>the first $A_3$ supply air flow rate, and the first $A_1$ exhaust air flow rate>the first $A_2$ exhaust air flow rate>the first $A_3$ exhaust air flow rate are satisfied.

Therefore, an effect can be achieved, where, in order to precisely control, based on an outdoor air temperature lowering to another outdoor air temperature (n-th predetermined temperature) at which only an exhaust air operation is selected, and an indoor humidity, the motors to achieve appropriate air flow rates at which moisture neither condenses nor freezes on the exhaust air side of the heat exchange element, air flow rates for an air heat exchange operation with a supply air operation and an exhaust air operation can be kept until further immediately before moisture condenses or freezes on the heat exchange element.

In addition, the heat exchanger ventilator includes the air supply fan equipped with the air supply motor, the air exhaust fan equipped with the air exhaust motor, the supply air conduit along which air is sent from outdoors to indoors by the air supply fan, and the exhaust air conduit along which air is sent from indoors to outdoors by the air exhaust fan. In addition, at a position where the supply air conduit and the exhaust air conduit intersect, the heat exchange element is provided for exchanging heat between indoor air and outdoor air while ventilation. In addition, in the exhaust air conduit, a temperature and humidity detection unit for detecting a temperature and humidity is provided at a position downstream of the heat exchange element, and the air supply motor and the air exhaust motor are controlled for operations and speed by a controller. In addition, the controller calculates a first dew point temperature based on a temperature and humidity detected by the temperature and humidity detection unit, and controls, after the first dew point temperature is calculated, when a temperature detected by the temperature and humidity detection unit is equal to or above the first dew point temperature, the air supply motor and the air exhaust motor to keep their speed. In addition, when a temperature detected by the temperature and humidity detection unit is below the first dew point temperature, the controller reduces speed of the air supply motor and the air exhaust motor so that a predefined first supply air flow rate and a predefined first exhaust air flow rate are attained.

Therefore, even when moisture would be likely to condense on the heat exchange element, a supply air flow rate and an exhaust air flow rate are lowered to increase heat exchange efficiency of the heat exchange element. Therefore, by raising a temperature on the exhaust air side of the heat exchange element to lower humidity on the exhaust air side of the heat exchange element, an operation for exchanging heat between supply air and exhaust air can be continued while preventing moisture from condensing or freezing on the outlet portion on the exhaust air side of the heat exchange element.

In addition, after the controller detects that a temperature detected by the temperature and humidity detection unit is below the first dew point temperature, the controller may calculate a second dew point temperature based on a temperature and humidity detected by the temperature and humidity detection unit to perform a control described below. That is, when the controller detects that, after the second dew point temperature is calculated, a temperature detected by the temperature and humidity detection unit is below the second dew point temperature, the controller further reduces speed of the air supply motor and the air exhaust motor so that a predefined second supply air flow rate and a predefined second exhaust air flow rate are attained.

Therefore, air flow rates can precisely be controlled to appropriate air flow rates at which moisture neither condenses nor freezes on the exhaust air side of the heat exchange element, and greater air flow rates can be kept under any temperature and humidity conditions for an air heat exchange operation with a supply air operation and an exhaust air operation until further immediately before moisture condenses or freezes on the heat exchange element.

In addition, when the controller detects that a temperature detected by the temperature and humidity detection unit is below a predefined freezing warning temperature, the controller may forcibly stop the air supply motor from rotating, without stopping the air exhaust motor from rotating, to continue a ventilation operation with only an exhaust air operation.

Therefore, even when a heat exchange operation is continued, the heat exchange element can be prevented from freezing, and a ventilation operation can be continued.

In addition, when the controller detects that a temperature detected by the temperature and humidity detection unit is below the freezing warning temperature, the controller may increase a speed of the air exhaust motor to continue a ventilation operation only with an exhaust air operation.

Therefore, even if moisture freezes on an outlet portion on a discharge side of the heat exchange element, the frozen state can promptly be solved. Even if moisture condenses on the outlet portion on the discharge side of the heat exchange element, the condensed state can also promptly be solved.

INDUSTRIAL APPLICABILITY

A heat exchanger ventilator is applicable as a duct type ventilator or a duct type air conditioner for exchanging heat between outdoor air and indoor air.

REFERENCE MARKS IN THE DRAWINGS

1: heat exchanger ventilator
2: outdoor air suction port
3: indoor air exhaust port
4, 102: outdoor air supply port
5: indoor air suction port
6, 103: heat exchange element
7: supply air conduit
8: exhaust air conduit
9, 109: air supply fan
10, 110: air exhaust fan
11: controller
12: air cleaning filter
13: temperature detection unit
14: humidity detection unit
15: temperature and humidity detection unit
101: ventilator body
104: indoor air supply port
105: indoor exhaust port
106: outdoor exhaust port
107: motor
108: shaft

The invention claimed is:

1. A heat exchanger ventilator comprising:
an air supply fan equipped with an air supply motor;
an air exhaust fan equipped with an air exhaust motor;
a supply air conduit along which air is sent from outdoors to indoors by the air supply fan;
an exhaust air conduit along which air is sent from indoors to outdoors by the air exhaust fan; and
a heat exchange element provided at a position where the supply air conduit and the exhaust air conduit intersect, for exchanging heat between indoor air and outdoor air when the indoor air and the outdoor air are ventilated,
wherein
in the supply air conduit, a temperature detection unit is provided at a position upstream of the heat exchange element,
in the exhaust air conduit, a humidity detection unit is provided at a position upstream of the heat exchange element,
the air supply motor and the air exhaust motor are controlled for operations and speed by a controller, and
the controller reduces, when a temperature detected by the temperature detection unit is below a first predetermined temperature, and a humidity detected by the humidity detection unit falls within a first predetermined humidity range, speed of the air supply motor and the air exhaust motor so that a predefined first $A_1$ supply air flow rate and a predefined first $A_1$ exhaust air flow rate are attained, and reduces, when a humidity detected by the humidity detection unit falls within a second predetermined humidity range, speed of the air supply motor and the air exhaust motor so that a predefined first $A_2$ supply air flow rate and a predefined first $A_2$ exhaust air flow rate are attained, where a maximum value of the first predetermined humidity range<a minimum value of the second predetermined humidity range, the first $A_1$ supply air flow rate>the first $A_2$ supply air flow rate, the first $A_1$ exhaust air flow rate>the first $A_2$ exhaust air flow rate are satisfied.

2. The heat exchanger ventilator according to claim 1, wherein
when the controller detects that a temperature detected by the temperature detection unit is below an n-th predetermined temperature, where n is an integer equal to or above 2, after the controller detects that a temperature detected by the temperature detection unit is below the first predetermined temperature and reduces speed of the air supply motor and the air exhaust motor, the controller stops the air supply motor from rotating, without stopping the air exhaust motor from rotating, to continue a ventilation operation only with an exhaust air operation, where the n-th predetermined temperature is satisfied.

3. The heat exchanger ventilator according to claim 2, wherein
when n is an integer equal to or above 3, after the controller detects that a temperature detected by the temperature detection unit is below the first predetermined temperature, and before the controller detects that a temperature detected by the temperature detection unit is below the n-th predetermined temperature, when the controller detects that a temperature detected by the temperature detection unit is below a k-th predetermined temperature, where k is an any integer of 2, 3, ..., and n−1, and humidity detected by the humidity detection unit falls within the first predetermined humidity range, the controller keeps or reduces speed of the air supply motor and the air exhaust motor so that a predefined k-th $A_1$ supply air flow rate and a predefined k-th $A_1$ exhaust air flow rate are attained, and, when humidity detected by the humidity detection unit falls within the second predetermined humidity range, the controller keeps or reduces speed of the air supply motor and the air exhaust motor so that a predefined k-th $A_2$ supply air flow rate and a predefined k-th $A_2$ exhaust air flow rate are attained, where the n-th predetermined temperature<the k-th predetermined temperature<the first predetermined temperature, the k-th $A_1$ supply air flow rate≤the first $A_1$ supply air flow rate, the k-th $A_1$ exhaust air flow rate≤the first $A_1$ exhaust air flow rate, the k-th $A_1$ supply air flow rate>the k-th $A_2$ supply air flow rate, and the k-th $A_1$ exhaust air flow rate>the k-th $A_2$ exhaust air flow rate are satisfied.

4. The heat exchanger ventilator according to claim 3, wherein when n=3, after the controller detects that a temperature detected by the temperature detection unit is below the first predetermined temperature, and before the controller detects that a temperature detected by the temperature detection unit is below a third predetermined temperature, when the controller detects that a temperature detected by the temperature detection unit is below a second predetermined temperature, and humidity detected by the humidity detection unit falls within the first predetermined humidity range, the controller keeps or reduces speed of the air supply motor and the air exhaust motor so that a predefined second $A_1$ supply air flow rate and a predefined second $A_1$ exhaust air flow rate are attained, and, when humidity detected by the humidity detection unit falls within the second predetermined humidity detected by the humidity detection unit falls within the second predetermined humidity range, the controller keeps or reduces speed of the air supply motor and the air exhaust motor so that a predefined second $A_2$ supply air flow rate and a predefined second $A_2$ exhaust air flow rate are attained, where the third predetermined temperature<the second predetermined temperature<the first predetermined temperature, the second $A_1$ supply air flow rate≤the first $A_1$ supply air flow rate, the second $A_1$ exhaust air flow rate≤the first $A_1$ exhaust air flow rate, the second $A_1$ supply air flow rate>the second $A_2$ supply air flow rate, and the second $A_1$ exhaust air flow rate>the second $A_2$ exhaust air flow rate are satisfied.

5. The heat exchanger ventilator according to claim 1, wherein a temperature detected by the temperature detection unit is below the first predetermined temperature, and humidity detected by the humidity detection unit falls within a third predetermined humidity range, the controller reduces speed of the air supply motor and the air exhaust motor so that a predefined first $A_3$ supply air flow rate and a predefined first $A_3$ exhaust air flow rate are attained, where a maximum value of the second predetermined humidity range<a minimum value of the third predetermined humidity range, the first $A_1$ supply air flow rate>the first $A_2$ supply air flow rate>the first $A_3$ supply air flow rate, and the first $A_1$ exhaust air flow rate>the first $A_2$ exhaust air flow rate>the first $A_3$ exhaust air flow rate are satisfied.

* * * * *